July 14, 1959 — A. J. ZUPANCIC — 2,894,735
FUEL METERING SYSTEM
Filed Feb. 25, 1957 — 2 Sheets-Sheet 1
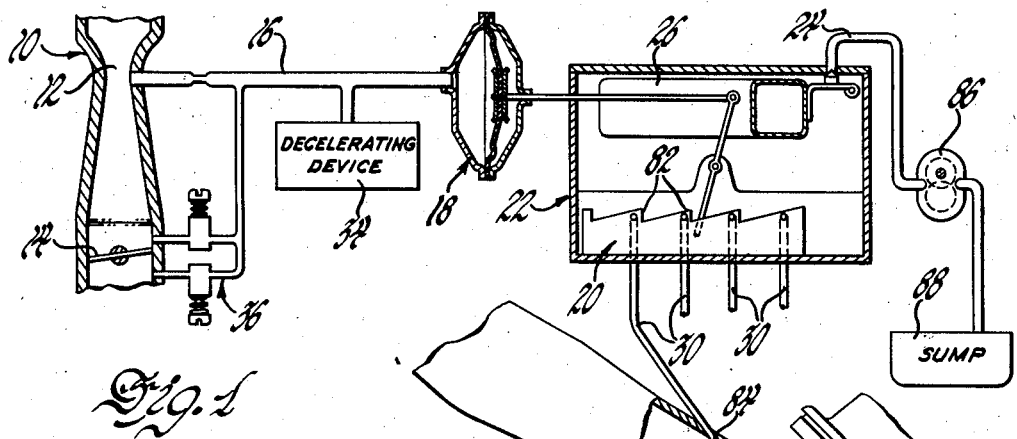
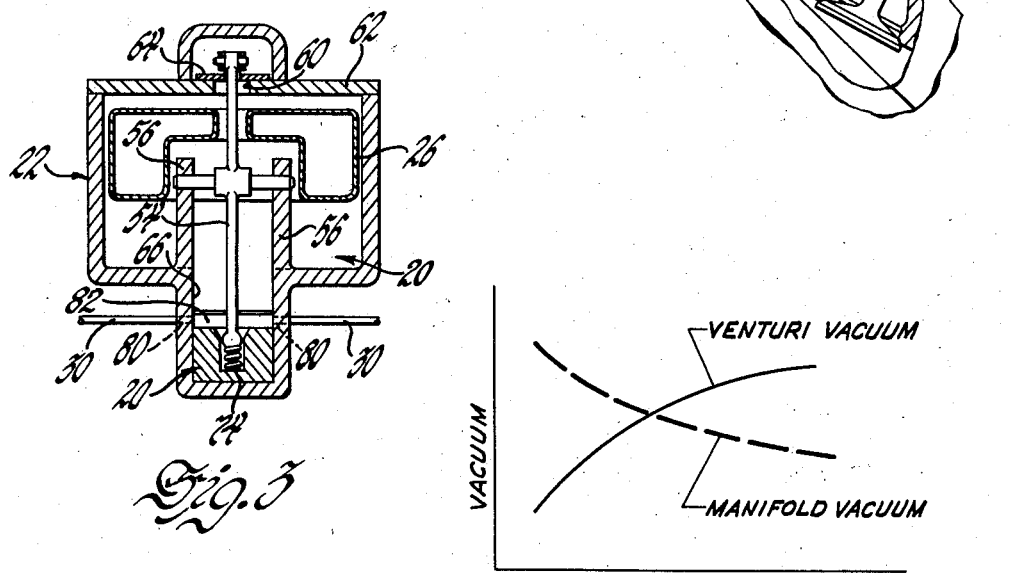
INVENTOR.
Albert J. Zupancic
BY
R. F. Barnard
ATTORNEY.

July 14, 1959     A. J. ZUPANCIC     2,894,735
FUEL METERING SYSTEM
Filed Feb. 25, 1957                                  2 Sheets-Sheet 2
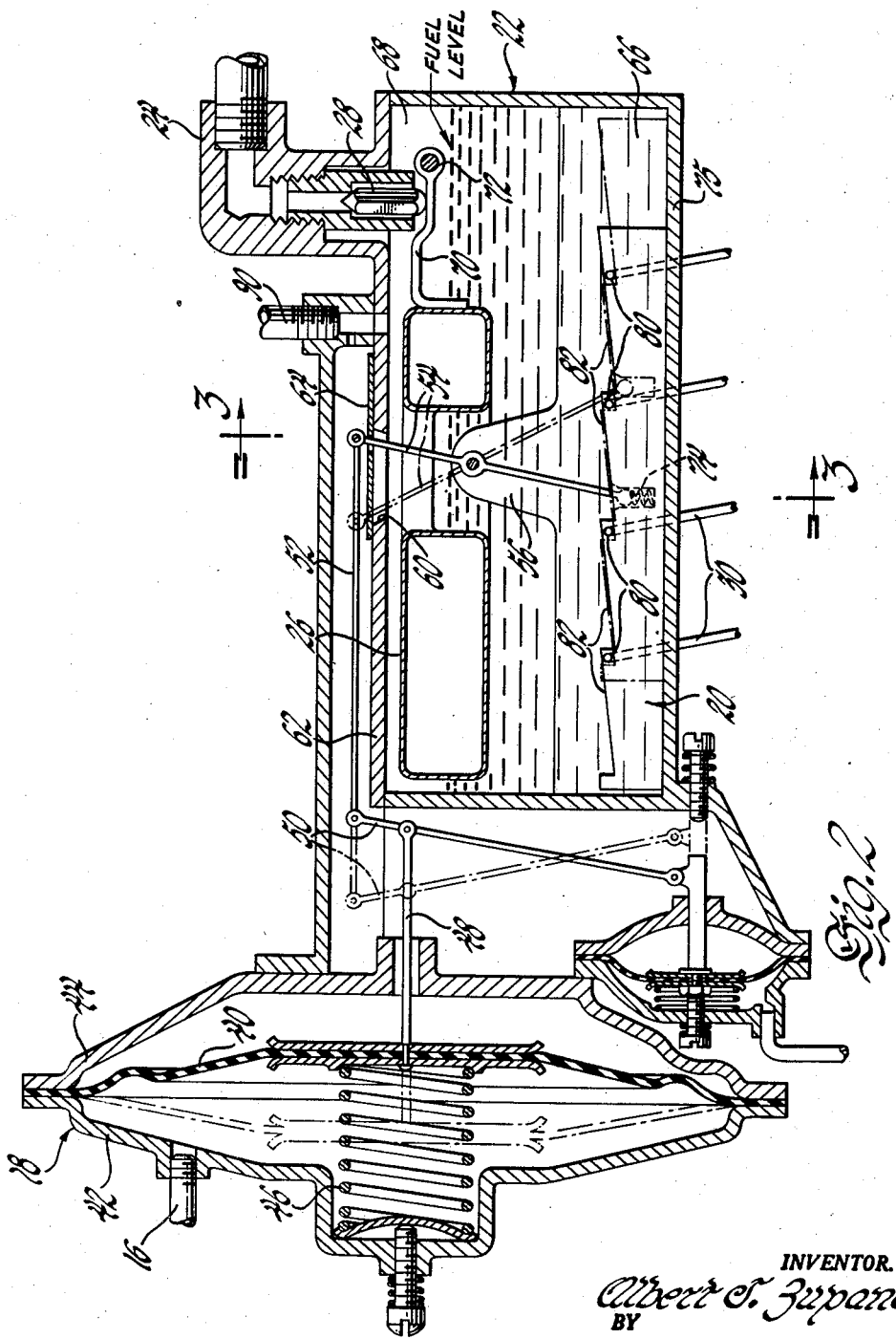
INVENTOR.
Albert J. Zupancic
BY
R. T. Barnard
ATTORNEY.

United States Patent Office 2,894,735
Patented July 14, 1959

2,894,735

FUEL METERING SYSTEM

Albert J. Zupancic, Royal Oak, Mich., assignor to General Motors Corporation, Detroit, Mich., a corporation of Delaware Application February 25, 1957, Serial No. 642,290

4 Claims. (Cl. 261—69)

The present invention relates to a fuel metering system for an internal combustion engine. More particularly this invention relates to a fuel metering system of the type in which fuel is injected into a cylinder intake passage immediately anterior of the engine's cylinder in a manner designed to result in a fuel injection system more economical to build and yet sacrificing nothing in performance as compared with more elaborate systems.

In fuel injection systems of the type shown in copending application Serial No. 641,629, filed Feb. 21, 1957 and now Patent No. 2,841,131, granted July 1, 1958 or Serial No. 608,797 Olson, filed September 10, 1956, fuel is metered to the engine under pressure through individual nozzles in a quantity which is proportional to the mass of air flowing through the system. In such systems the fuel is normally continuously flowing with that amount in excess of engine needs being returned through suitable lines to a fuel reservoir and subsequently recirculated through the system. The present invention represents an improvement in such systems by providing a system which permits the elimination of such return flow lines and also eliminates the power lost in continuously circulating fuel, but at the same time retaining the basically advantageous aspects of the mass air flow system.

In addition, the fuel metering systems referred to in the above copending applications in metering fuel under pressure in proportion to the mass of air flow through the system normally provide means to render the fuel flow non-responsive to changes in the manifold vacuum otherwise continuously acting on the fuel lines as they enter the intake passages. In the present metering system manifold vacuum is utilized to provide the force causing fuel to flow in the system. In this way the flow of fuel in the present system is actually responsive to variations in manifold vacuum and thereby utilize an ever present force which must otherwise, in conventional mass air flow systems, be compensated for. This vacuum force is indicative of an engine demand and as uniquely incorporated into the present system provides fuel control which accurately reflects engine requirements under all operating conditions.

In addition to providing a fuel control system which responds to all engine operating conditions, the present system in utilizing manifold vacuum as the fuel flow motivating force eliminates the need for a pump which otherwise must provide such force.

The present system utilizes the mass of air flowing through the induction passage as an indication of the quantity of fuel desired by the engine. Thus, in effect, this unique system is a combination of a mass air flow with a speed density type control and which combination incorporates the advantages of each system while eliminating certain of the disadvantages of each system.

In the present fuel metering mechanism the mass air flow control force is isolated from the manifold vacuum control force in a way which permits each to perform its control function without directly affecting the other.

In the drawings:

Figure 1 is a diagrammatic representation of the subject control system;

Figure 2 is an enlarged view of the servo valve fuel controlling mechanism;

Figure 3 is a view along line 3—3 of Figure 2; and

Figure 4 is a graph representing certain control forces utilized in the present system.

The details of the fuel metering system, except as they will be specifically described in the present application, are the same as those shown in copending application Serial No. 641,629, filed February 21, 1957. In general a fuel induction passage is shown at 10 and includes a venturi 12 and a throttle valve 14. A conduit 16 connects the venturi 12 with a servo 18, the latter which controls a fuel metering valve 20. The fuel metering valve is disposed within a fuel reservoir 22 which is supplied with fuel from a fuel inlet line 24, the flow through which is controlled by a float 26 and a needle valve 28, in a conventional manner. A plurality of fuel conduits 30 lead from the fuel reservoir 22 to the respective intake passages 32 for the engine's cylinders and in this way provide for the individual flow of fuel to each cylinder.

A deceleration fuel cut-off device is shown diagrammatically at 34 and is described in detail in the aforenoted application Serial No. 641,629, filed February 21, 1957 and need not, therefore, be further referred to for the purposes of the present description. Likewise, the idle and off-idle vacuum system indicated generally at 36 is described in the aforenoted application.

Referring now to the detailed view of the control system shown in Figures 2 and 3 it will be seen that a metering diaphragm 40 is peripherally clamped between casing portions 42 and 44 and is normally biased by a spring 46 toward the right or flow reducing direction. A rod 48 is centrally secured to diaphragm 40 for movement therewith and is articulated through links 50 and 52 to a lever 54 pivoted intermediate its ends to a pair of trunnion members 56 formed on the float bowl 22. Lever 54 projects upwardly through a slotted opening 60 in the upper casing wall 62 and has loosely connected therewith a sliding cover 64 which prevents fuel from splashing out of the float bowl.

The stepped metering valve 20 is disposed in a bottom portion 66 of the float bowl casing. Casing portion 66 is narrower than the upper portion 68 of the float casing being of sufficient width merely to accommodate sliding movement of the metering valve. The enlarged or upper portion 68 of the float bowl 22 contains the float member 26 which is pivotally mounted within the casing through a lever 70 articulated to the casing at 72 and which lever is adapted to coact with the metering valve 28 to control the flow of fuel into the float chamber in accordance with the level of fuel therein contained.

The lower end of lever 54 is articulated to the metering valve 20 so as to move the latter in accordance with changes in the mass of air flowing through the induction passage 10. A spring 74 is disposed intermediate the lever 54 and valve 20 to retain the latter against the bottom wall 75 of the casing.

Ports 80 are formed in the side walls of casing portion 66 and communicate with the respective fuel conduits 30. Each of the ports 80 is adapted to be disposed adjacent one of the steps 82 on the metering valve 20 in such a way that as the valve shifts within casing portion 66 the ports will be more or less uncovered, depending on the direction of valve movement, thereby conditioning the system for the flow of fuel in accordance with other forces to be subsequently considered. Ends 84 of fuel conduits 30 project within the intake passages 32 immediately anterior of the engine cylinder and in so doing are adapted to deliver fuel to the cylinders in quantities varying with various engine operating conditions. Inasmuch as the ends 84 of conduits 30 are disposed within the intake passages 32 they are subjected to manifold vacuum which causes the fuel in conduits 30 to flow in direct proportion to the magnitude of such vacuum.

In previous mass air flow systems of the type shown in Serial No. 608,797 Olson, filed September 10, 1956, the quantity of fuel flowing to the various cylinders is proportional to the differential effect on a metering valve of the of the mass of air flowing through the system and the pressure of the fuel which is proportional to engine speed. Inasmuch as such a differential force is calibrated to supply fuel solely in accordance with the mass of air flow it is necessary frequently to provide special atmospheric type nozzles such as that shown in copending application Serial No. 608,895, in order to eliminate any effect of manifold vacuum on the metering function. It has been found by the present simplified system that manifold vacuum rather than being eliminated as a control force may, in fact, be utilized to provide the motive force causing the fuel to flow and in this way reducing the pressure under which the system operates and also making the same less expensive by eliminating the need for a pump which will maintain the fuel under particular pressures. The only pump required in the present system is an inexpensive make-up fuel pump 86 which merely delivers fuel to the inlet 24 of the float casing 58 from a sump 88. Inasmuch as the manifold vacuum in intake passages 32 can only act on the fuel in conduits 30 and therethrough on the fuel in reservoir 22 is has no effect on the metering function of valve 20 which remains solely under the control of the mass air flow mechanism which has already been described in the previous applications referred to. As already noted, since the fuel will flow through conduits 30 and hence into intake passages 32 in accordance with the manifold depression, reflecting the needs of each cylinder, it is unnecessary to utilize a continuous flow system, as is used in the aforenoted applications, accordingly, the need for return flow lines to fuel sump 88 is eliminated.

An atmospheric vent 90 is formed in the float bowl 22 so that the latter is maintained under an atmospheric pressure. It is apparent that the only pressure on the fuel in the float bowl 22 is due to gravity acting on the fuel itself, thus the quantity of fuel being supplied to the cylinders is determined by two control forces. First, the mass air flow signal which is transmitted through the diaphragm 40 to control the opening of ports 80 through which fuel may flow to the conduits 30 and, secondly, the magnitude of manifold vacuum which determines the pressure tending to cause the fuel to flow.

From the foregoing it is apparent that the present fuel metering system is, in effect, a combination of a mass air flow system and a speed density system as those terms are generally understood in the fuel injection art at the present time. It may be well to consider further the theory of combining systems which heretofore have been treated as being mutually exclusive. In a straight mass air flow type system it has generally been found necessary to provide means for supplementing the vacuum metering signal under low air conditions, corresponding generally to low engine speeds, to insure adequate fuel flow. Manifold vacuum on the other hand is greatest during low engine speed operation and decreases with engine speed. These relationships are graphically depicted in Figure 4 in which venturi vacuum is shown in solid line and manifold vacuum by a broken line. It becomes apparent that these fundamental characteristics may be combined to provide a more satisfactory fuel metering system that can be realized by use of manifold or venturi vacuums alone.

Thus, in the present system, under low engine speed operation servo diaphragm 40 will shift valve 20 to a position restricting flow through ports 80. The venturi vacuum signal is weak under these conditions but is in effect reinforced or supplemented by manifold vacuum which is high and provides greater suction on the fuel in conduits 30 causing the fuel to flow at the maximum rate commensurate with the degree of opening of ports 80. Correspondingly, at higher engine speeds the drop in manifold vacuum is offset by greater opening of ports 80 due to increased venturi vacuum. In this manner a more stable steady state engine operation is achieved.

I claim:

1. A fuel metering system for an internal combustion engine comprising an induction passage for supplying air to the engine, a throttle valve for controlling the quantity of flow through said passage, a plurality of intake passages communicating with the induction passage for supplying air to the individual engine cylinders, a fuel reservoir, a fuel conduit connecting each intake passage with the reservoir, a float controlled valve for controlling the quantity of fuel in the reservoir, valve means disposed in the reservoir for controlling the flow of fuel through the conduits, servo means operatively connected to the valve means, a venturi in the induction passage, a conduit communicating the venturi with said servo conveying thereto a control force which is proportional to the mass of air flowing through the induction passage, each of the fuel conduits having an end projecting within an intake passage immediately anterior of the cylinder whereby the force causing fuel to flow through the fuel conduits is proportional to the manifold vacuum in the intake passages.

2. A fuel metering system for an internal combustion engine comprising an induction passage for supplying air to the engine, a throttle valve for controlling the quantity of flow through said passage, a plurality of intake passages communicating with the induction passage for supplying air to the individual engine cylinders, a fuel reservoir housing, a plurality of fuel ports in said housing, a fuel conduit connecting each port with an intake passage, valve means disposed in the reservoir and including a plurality of identical tapered surfaces each of which coacts with one of said ports for controlling the flow of fuel through the associated conduit, servo means operatively connected to the valve means, a venturi in the induction passage, a conduit communicating the venturi with said servo conveying thereto a control force which is proportional to the mass of air flowing through the induction passage, each of the fuel conduits having an end projecting within an intake passage immediately anterior of the cylinder whereby the force causing fuel to flow through the fuel conduits is proportional to the manifold vacuum in the intake passages.

3. A fuel induction system as set forth in claim 1 in which said reservoir comprises a casing having an upper portion within which said float controlled valve is disposed and lower portion in which said valve means is disposed.

4. A fuel metering system for an internal combustion engine comprising an induction passage for supplying air to the engine, a throttle valve for controlling the quantity of flow through said passage, a plurality of intake passages communicating with the induction passage for supplying air to the individual engine cylinders, a fuel reservoir having upper and lower portions, a float controlled valve in said upper portion, a plurality of ports in said lower portion, a fuel conduit connecting each port with an intake passage, valve means disposed in the lower portion of said reservoir and including a plurality of identical tapered surfaces each of which coacts with one of said ports for controlling the flow of fuel through the associated conduit, servo means operatively connected to the valve means, a venturi in the induction passage, a conduit communicating the venturi with said servo conveying thereto a control force which is proportional to the mass of air flowing through the induction passage causing said tapered valve surfaces to uncover said ports as said control force increases, each of the fuel conduits having an end projecting within an intake passage immediately anterior of the cylinder whereby the force causing fuel to flow through the fuel conduits is proportional to the manifold vacuum in the intake passages.

References Cited in the file of this patent

UNITED STATES PATENTS

| | | |
|---|---|---|
| 2,281,411 | Campbell | Apr. 28, 1942 |
| 2,442,399 | Chandler | June 1, 1948 |
| 2,448,131 | Williams | Aug. 31, 1948 |
| 2,502,679 | Stanly | Apr. 4, 1950 |
| 2,511,213 | Leslie | June 13, 1950 |